United States Patent [19]

Vreeburg et al.

[11] Patent Number: 5,408,879

[45] Date of Patent: Apr. 25, 1995

[54] ASSEMBLY OF LINEAR ACCELEROMETERS MOUNTED ON A RIGID BODY REMOTE FROM THE CENTER OF MASS MEASURING THREE DIMENSIONAL MOVEMENTS

[75] Inventors: Johannes P. B. Vreeburg, Leiden; Ronald H. Huijser, Amsterdam, both of Netherlands

[73] Assignee: Fokker Aircraft B.V., Schiphol, Netherlands

[21] Appl. No.: 15,786

[22] Filed: Feb. 10, 1993

[30] Foreign Application Priority Data

Feb. 11, 1992 [EP] European Pat. Off. ............ 92200391

[51] Int. Cl.[6] ............................................ G01P 15/08
[52] U.S. Cl. .................... 73/517 A; 73/517 R
[58] Field of Search ................ 73/510, 517 A, 517 R, 73/514; 33/321

[56] References Cited

U.S. PATENT DOCUMENTS 4,590,801  5/1986  Merhav ............................. 73/517 R
4,996,877  3/1991  Stewart et al. ....................... 73/510

FOREIGN PATENT DOCUMENTS 0301816  2/1989  European Pat. Off. .
2146776  4/1985  United Kingdom .

OTHER PUBLICATIONS

Transactions of the ASME, Journal of Applied Mechanics 1 Sep. 1975, New York, pp. 552–556.

*Primary Examiner*—Richard E. Chilcot, Jr.
*Assistant Examiner*—Joseph L. Felber
*Attorney, Agent, or Firm*—Handal & Morofsky

[57] ABSTRACT

The invention provides an assembly of accelerometers for use in a system for measuring the three dimensional movements of a rigid body comprising nine linear accelerometers which are connected to said rigid body in a spacial configuration with reference to an imaginary orthogonal coordinate system. At a first position on the X-axis at a predetermined distance from the origin two accelerometers are installed, the sensitive directions thereof being parallel to the Y-axis and to the Z-axis respectively. At a second position on the Y-axis of the coordinate system at a predetermined distance from the origin two accelerometers are installed, the sensitive directions being parallel to the X-axis and to the Z-axis respectively. At a third position on the Z-axis at a predetermined distance from the origin two accelerometers are installed, the sensitive directions being parallel to the X-axis and to the Y-axis respectively. Three further accelerometers are installed midway on the edges between the first, second and third positions, the sensitive axes of these further accelerometers each coinciding with a line through the origin of the coordinate system.

10 Claims, 4 Drawing Sheets

ASSEMBLY OF LINEAR ACCELEROMETERS MOUNTED ON A RIGID BODY REMOTE FROM THE CENTER OF MASS MEASURING THREE DIMENSIONAL MOVEMENTS

BACKGROUND OF THE INVENTION

The invention relates to an assembly of accelerometers for application in a system for measuring the three dimensional movements of a rigid body which accelerometers are connected to said rigid body in a spacial configuration with reference to an imaginary orthogonal coordinate system.

In general ballistometry is the collection of techniques and algorithms used for the reconstruction of the motion of a free-floating body from a record of measurements. This includes satellite attitude reconstruction from onboard measurements but also the tracking of motions of a rigid body by any of a variety of methods. These methods may include the use of optical sensors, gyroscopes, accelerometers or cinematographic or photogrammetric observation of position an attitude of a rigid body.

There are several reasons to opt for the use of accelerometers, one of which is that accelerometers and their associated electronics require the least mass and volume. These factors weigh heavily in space research programs, one of the possible application fields of this invention.

The motion of a rigid body can always be analyzed into a linear and an angular velocity. The kinematic variables appear as parameters in the representation of the acceleration field that is related to the rigid body. The number of accelerometers used, their location on the rigid body and the relative positioning of their sensitive axes in the acceleration field determine the resulting number and value of the kinematic parameters as well as the computations necessary for the reconstruction of the motion of the rigid body.

Prior art ballistometry focuses on the number of accelerometers and the relative positioning of their sensitive axes. In this respect it is common knowledge that a minimum of six linear accelerometers is required for a complete definition of the kinematic variables of a rigid body. Five linear accelerometers are required to compute all three components of angular acceleration about the body-fixed axes of the acceleration field of the rigid body. A sixth accelerometer is needed to provide, in addition, all three components of linear acceleration for complete definition of rigid body motion.

The computation of angular acceleration of a rigid body from measured linear accelerations is a relatively simple procedure based on well-known kinematic principles. The determination of arbitrary motion with six sensors involves (numerical) integration or differentiation. Because of errors in measurement, these stepwise integration or differentiation procedures usually result in an accumulation of errors. These problems are described by PADGOANKER et al in "Measurement of Angular Acceleration of a Rigid Body Using Linear Accelerometers." (in Journal of Applied Mechanics, September 1975, pages 552–556). To solve these problems Padgoanker et.al. introduce the use of nine accelerometers instead of six, position them in a predetermined spacial configuration with their sensitive axes directed such that by relatively simple calculations on the accelerometer outputs the linear and angular acceleration components of the motion of the rigid body to which the accelerometers are attached can be determined. More specifically the prior art configuration comprises nine accelerometers, three of which are located at the origin of an imaginary orthogonal coordinate system which is fixed with respect to the rigid body of which the motions are measured. The sensitive axis of these three accelerometers are trained respectively in the direction of Z, Y and X-axis of the coordinate system. This prior art nine accelerometer configuration furthermore comprises a set of two accelerometers on each of the orthogonal axes of the coordinate system at a predetermined distance from the origin. The sensitive axes of the two accelerometers positioned on the X-axis of the coordinate system are trained respectively parallel to Y-axis and parallel to the Z-axis. The sensitive axes of the two accelerometers positioned on the Y-axis of the coordinate system are trained respectively parallel to the X-axis and parallel to the Z-axis. The sensitive axes of the two accelerometers positioned on the Z-axis of the coordinate system are trained respectively parallel to the X-axis and parallel to the Y-axis.

Rotation of the rigid body can cause problems when the rotation is three-dimensional and there are errors in the measured linear accelerations. As stated before errors in measurement can result in an accumulation of errors when stepwise (numerical) computations are performed. MITAL et.al. introduce in "Computation of Rigid-Body Rotation in Three-Dimensional Space From Body-Fixed Linear Acceleration Measurements." (in Journal of Applied Mechanics, Vol. 46, December 1979, page 925–930) a method which generates an orthogonal transformation matrix, which needs to be evaluated only when it is required to transform a position vector from the body-fixed frame to the inertially fixed reference frame.

It will be clear now that a nine sensor arrangement can allow a direct determination of linear acceleration (a) of the origin O of the acceleration field of the rigid body as well as the angular velocity ($\omega$) and of the angular acceleration ($\dot{\omega}$) by algebraic operations on the accelerometer output. This is a stable calculation and leaves scope for additional extraction of parameter values from the comparison of angular velocity and angular acceleration by calculation and measurement.

However the nine sensor arrangement according to prior art has three accelerometers at the origin of an imaginary orthogonal coordinate system which is fixed with respect to the rigid body of which the motions have to be measured. For no motion of the center of mass of the rigid body it is clear that in that case the origin of the coordinate system should be put at the center of mass of the rigid body and measurement of angular velocity is possible with three sensors. Usually a free-floating rigid body will show only small excursions in the center of mass location and it is therefore advantageous to have the origin O of the coordinate system near the approximate center of mass position. However in general this location is centrally located in the rigid body to which the sensors are attached and is inaccessible. These circumstances make it desirable to have an arrangement that has no sensors at the origin of the coordinate system. None of the arrangements in the quoted literature fulfil this requirement.

SUMMARY OF THE INVENTION

It is therefore the purpose of the present invention to provide a planar nine sensor arrangement, without sensors at the origin of the orthogonal coordinate system, which arrangement, with the matching computations on the accelerometer outputs, results in accurate definition of the motion of a rigid body.

It is furthermore the purpose of the present invention to eliminate the laborious practice of individually mounting each accelerometer on the rigid body, aligning their sensitive axes and calibrating the whole rigid body arrangement.

In agreement with these objects the invention provides an assembly of accelerometers for use in a system for measuring the three dimensional movements of a rigid body comprising nine linear accelerometers which are connected to said rigid body in a spacial configuration, with reference to an imaginary orthogonal coordinate system, whereby at a first position on the X-axis of the coordinate system at a predetermined distance from the origin a first and second accelerometer are installed, the sensitive direction of the first accelerometer being parallel to the Y-axis and the sensitive direction of the second accelerometer being parallel to the Z-axis, at a second position on the Y-axis of the coordinate system at a predetermined distance from the origin a third and fourth accelerometer are installed, the sensitive direction of the third accelerometer being parallel to the X-axis and the sensitive direction of the fourth accelerometer being parallel to the Z-axis, and at a third position on the Z-axis of the coordinate system at a predetermined distance from the origin a fifth and sixth accelerometer are installed, the sensitive direction of the fifth accelerometer being parallel to the X-axis and the sensitive direction of the sixth accelerometer being parallel to the Y-axis, characterised in that, a seventh accelerometer is installed at a fourth position midway on a line between the first and second position, the sensitive axis of the seventh accelerometer coinciding with a line through said fourth position and the origin of the coordinate system, an eighth accelerometer is installed at a fifth position midway on a line between the second and third position, the sensitive axis of the eighth accelerometer coinciding with a line through said eighth position and the origin of the coordinate system and a ninth accelerometer is installed at a sixth position midway on a line between the third and first position, the sensitive axis of the ninth accelerometer coinciding with a line through said sixth position and the origin of the coordinate system.

It is preferred that the nine accelerometers are attached to a frame in the shape of a flat triangular base plate in an arrangement which locates two accelerometers on one end of each of its sides and one accelerometer midway along each of its sides. More preferably the triangular base plate consists of three elongated subassemblies the length of which corresponds to the length of a side of the base plate, each subassembly has two accelerometers at an end and one accelerometer midway between both ends.

DESCRIPTION OF THE PREFERRED EMBODIMENTS

Figure 1:
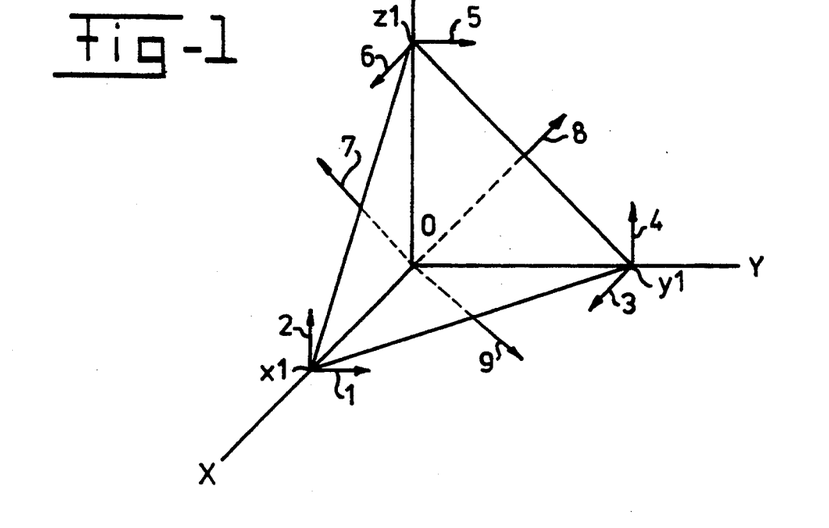
FIG. 1 illustrates the geometrical relative positioning of the nine accelerometers in a sensor configuration according to the invention.

FIG. 1 illustrates schematically an orthogonal reference coordinate system with the origin O and the three orthogonal axis X, Y and Z. Two accelerometers 1 and 2 are located at the position X1 on the X-axis at a predetermined distance from the origin O. Two accelerometers 3 and 4 are installed at a position Y1 on the Y-axis at a predetermined distance from the origin O. Two further accelerometers 5 and 6 are located at position Z1 having the same predetermined distance from the origin O. A further accelerometer 7 is installed midway on the line X1Z1 between the positions X1 and Z1. Another accelerometer 8 is installed midway on the line Y1Z1 between the positions Y1 and Z1 and another accelerometer 9 is installed midway on the line X1Y1 between the locations X1 and Y1. It is remarked that in FIG. 1 the accelerometers are not illustrated as such, only the axis of sensitivity of the various accelerometers are indicated by means of the illustrated arrows. More specifically the direction of sensitivity of the accelerometers 3 and 6 is perpendicular to the X-axis, the direction of sensitivity of the accelerometers 1 and 5 is parallel to the Y-axis, and the direction of sensitivity of the accelerometers 2 and 4 is parallel to the Z-axis. Furthermore the direction of sensitivity of accelerometer 7 coincides with a line through the origin O, and the same applies to the directions of sensitivity of the two further accelerometers 8 and 9.

Although not necessary, per se, it is preferred that the positions X1, Y1 and Z1 have identical distances to the origin O. In that case the positions X1, Y1 and Z1 determine together with the origin O a symmetrical tetrahedron.

With this arrangement of nine accelerometers it is possible to calculate the motion of the origin O in a very accurate manner. The output from the accelerometers 4, 5 and 8 on the line Y1Z1 is given by:

$$U_4 + U_5 = a_1 + a_2 + r\sqrt{2}\ \omega_1\omega_2$$

$$U_4 - U_5 = a_1 + a_2 + r\sqrt{2}\ \omega_3$$

$$2\sqrt{2}\ (U_4 + U_5) - 4U_8 = r\{(\omega + \omega_2)^2 + 2\omega_3^2\}$$

where $U_4$ = Output of accelerometer 4
$U_5$ = Output of accelerometer 5
$U_8$ = Output of accelerometer 8
$a_1$ = linear acceleration in direction of Y-axis
$a_2$ = linear acceleration in direction of Z-axis $r$ = distance between Z1 and Y1 =
= distance between X1 and Y1 =
= distence between X1 and Z1 =

$\omega_1$ = angular velocity about Y-axis
$\omega_2$ = angular velocity about Z-axis
$\dot{\omega}_1$ = angular acceleration about Y-axis
$\dot{\omega}_2$ = angular acceleration about Z-axis.
Similar expressions hold for the output of the accelerometers lines X1Z1 and Z1Y1.

The geometrical relative arrangement of the axes of sensitivity of the 9 accelerometers, without any accelerometers in the origin of the coordinate system, results in an accurate reconstruction of the motion of a rigid body. The physical arrangement according to this invention results in a pre-calibratable strap-down ballistometer, which is easy to produce, easy to install, and, in combination with a suitable data processor accurately reconstructs the motion of a rigid body. Some advantages of the inventive arrangement with no sensors at the origin are apparent. The origin of the coordinate system can now readily be put at the center of mass (or inertia) of the rigid body of which the motion is to be measured, since no physical connection, or presence of the measuring system is required at the center of mass.

Figure 2:
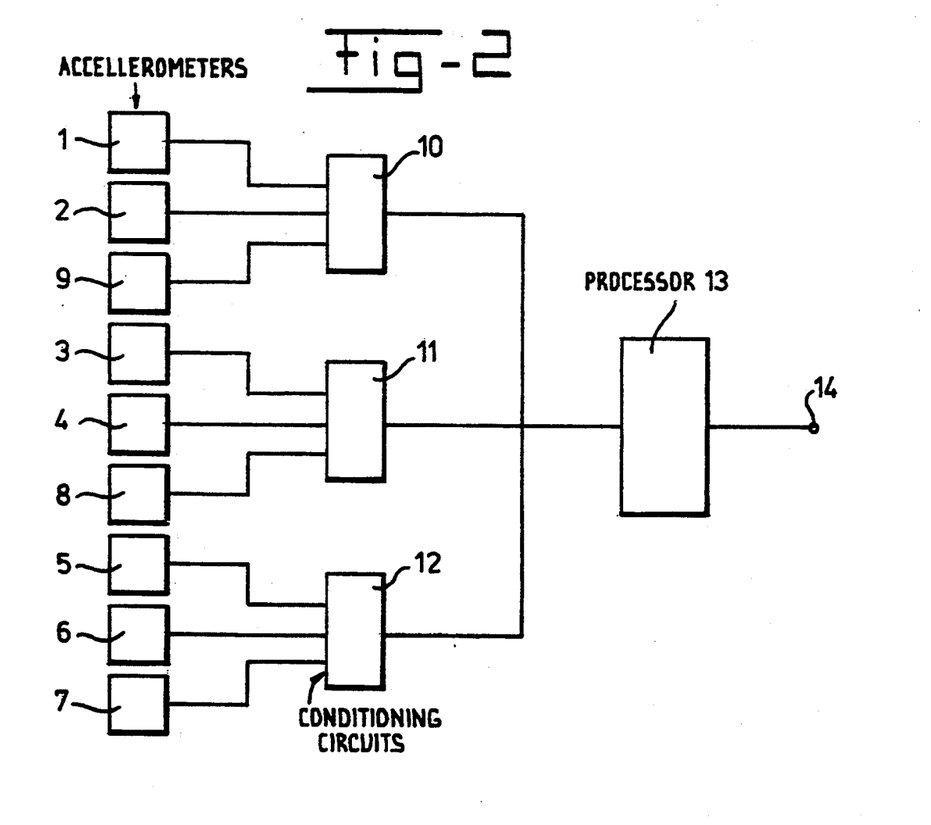
FIG. 2 illustrates in the form of a block diagram the connection between the accelerometers and the conditioning electronic circuits and between said circuits and a computer in which calculations are carried out on the data provided by the accelerometers.

The electronic circuitry for processing the electric signals derived from the various accelerometers as well as the processor used for performing the necessary calculations on the obtained data in agreement with the above-mentioned equations are schematically illustrated in FIG. 2. As appears from FIG. 2 the accelerometers are in sets of three connected to three different conditioning circuits. The accelerometers 1, 2, 9 are connected to circuit 10, the accelerometers 3, 4 and 8 are connected to circuit 11 and the accelerometers 5, 6, 7 are connected to circuit 12. Each of the conditioning circuits 10, 11 and 12 receives electronic signals from the connected accelerometers, amplifies and shapes the signals, if necessary and converts the signals into digital values suitable for processing by a computer or digital processor 13.

The processor 13 scans the digital values at the output of the various circuits 10, 11 and 12 and performs the necessary computations according to the above-mentioned equations to obtain the desired motion information which is made available at an output 14 of the processor 13. The actual embodiment of the circuits 10, 11 and 12 is considered to be known to a person skilled in the art and the same applies to the functioning and embodiment of the processor 13. Further details about these circuits 10, 11, 12 and processor 13 are therefore not provided. Suitable accelerometer conditioning is described in "Accelerometer sensor conditioning".

The results of the calculations performed by the processor 13, available at output 14 of the processor 13, can be stored for instance in a memory or can be transmitted, for instance, in the case of an object in space, along a telemetry communication path to a receiver.

Figure 3:
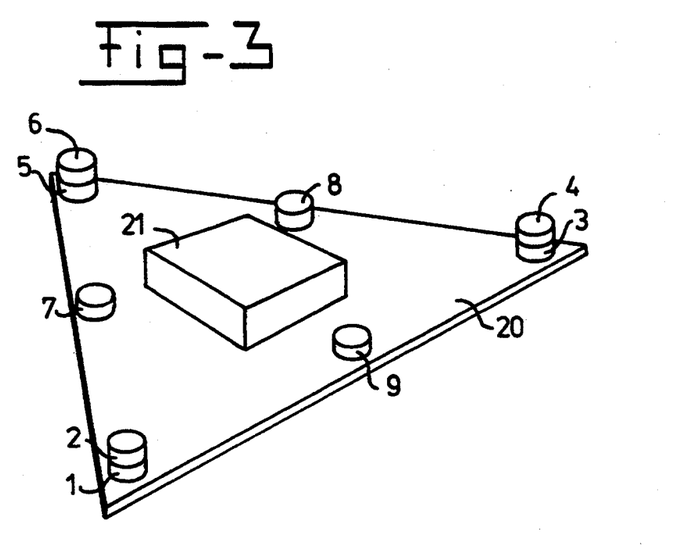
FIG. 3 illustrates a possible practical embodiment of the sensor configuration according to the invention.

Because the nine accelerometers 1...9 are physically arranged in planar configuration, or zone, in a plane including the three locations X1, Y1 and Z1 it is possible to use a planar structure support to accommodate the nine accelerometers. An example of such a structure is illustrated in FIG. 3. FIG. 3 illustrates schematically a planar triangular base plate 20 onto which the various accelerometers 1...9 are mounted. On each corner of the base plate 20 a set of two accelerometers (1, 2) (3, 4) and (5, 6) is installed whereas midway on the edges between the three vertexes the further accelerometers 7, 8 and 9 are installed.

The installation of each accelerometer is a matter of physically fixing the accelerometer at the preferred position in the two-dimensional plane, and additionally aligning the sensitive axis of the accelerometer in the correct direction. In fact if the physical position of the accelerometer is correct but the alignment of the sensitive axis is incorrect, the whole sensor arrangement will yield incorrect readings.

The open space in the center of the base plate 20 can be used to accommodate a housing 21 in which the conditioning circuits 10, 11 and 12 as well as the processor 13 are accommodated. For the sake of clarify the wires running from the various accelerometers to the housing 21 are not illustrated in FIG. 3.

To improve accuracy, the edges or sides of the triangular base plate 20 have to be selected as large as possible within the circumstances in which the arrangement has to be used. That implies that a relatively large base plate 20 has to be used which in many cases will give rise to difficulties.

Figure 4:
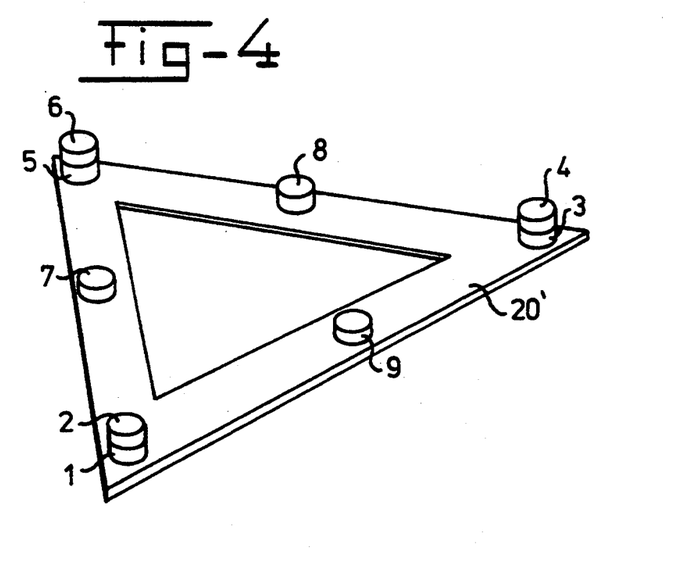
FIG. 4 illustrates another practical embodiment of a sensor configuration according to the invention.

FIG. 4 illustrates a further embodiment of a base plate 20' which avoids at least part of these problems. In this embodiment the central section of the base plate 20' is open providing space to accommodate parts of the host rigid body whose motions are to be measured. In FIG. 4 only the accelerometers 1...9 are illustrated. It will be clear that the conditioning electronics and the microprocessor can be installed elsewhere on the rigid body of which motion is robe measured, and wires running from the various accelerometers to the conditioning electronics are not illustrated in FIG. 4.

Figure 5:
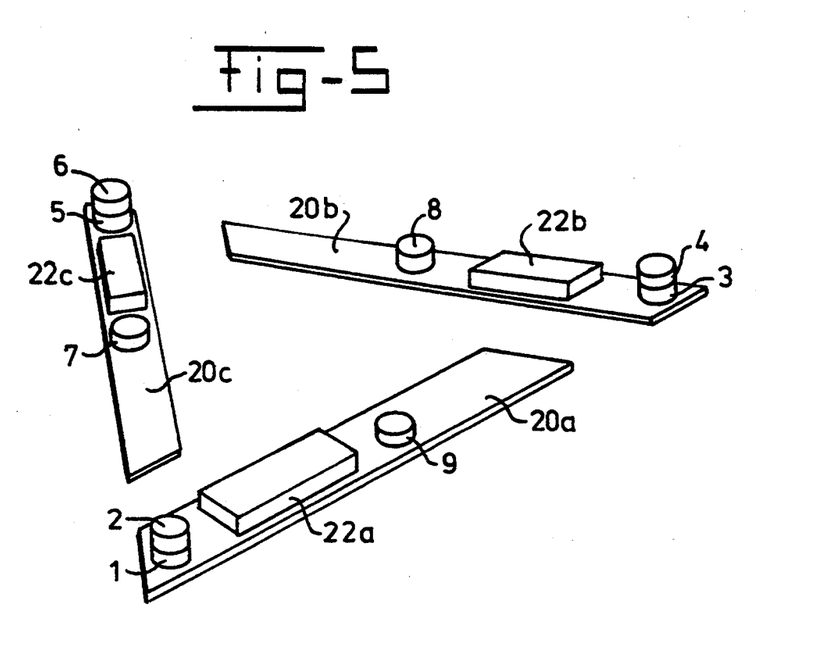
FIG. 5 illustrates a preferred embodiment of a sensor configuration according to the invention.

By subdividing the base plate 20' into three separate beams which can be fitted together, as illustrated in FIG. 5, the embodiment illustrated in FIG. 4 can be obtained. In this embodiment the housing comprises three beams 20a, 20b, 20c each carrying three accelerometers, two stacked at one and of the respective beam and one installed midway of the respective beam. The various accelerometers are indicated with the same reference numbers as used in FIG. 4. Preferably each of the beams 20a, 20b and 20c carries furthermore a part of the electronic circuitry necessary for amplifying and shaping the signals delivered by the accelerometers mounted on the same beam. In this way the subdivision of the base plate into three beams results in three identical subassemblies. This embodiment has the advantage that each of the subassemblies can be prefabricated, preadjusted and pretested before the configuration as a whole is installed on the body where motions are to be measured.

The configuration of the electronic circuitry illustrated in FIG. 2 was developed for the embodiment of FIG. 3. It will be clear from a comparison between FIGS. 2 and 5 that the housing 22a may accommodate electronics for conditioning circuit 10, the housing 22b may accommodate electronics for circuit 11 and the housing 22c may accommodate electronics for circuit 12.

Although not illustrated in FIG. 5, of each of the beams 20a, 20b and 20c may comprise fastening means to assemble the beams together into a configuration such as illustrated in FIG. 4. However, if the alignment of the various beams on the body, on which the accelerometers have to be used, will cause problems, or is taken care of in another manner, then in fact the beams 20a, 20b and 20c could be shorter, such that there is just enough space to accommodate the various sensors and electronics circuitry thereof.

It is noted that the term "beam", as used in this description should be understood as a component or structure on which sensors can be mounted, can be accurately positioned with respect to each other in the prescribed locations, and can be aligned in the correct direction so that their sensitive axes are pointing in the prescribed direction. It is therefore not necessary that the beam is an elongated flat piece of material. The beam can be embodied in other forms too.

Figure 6:
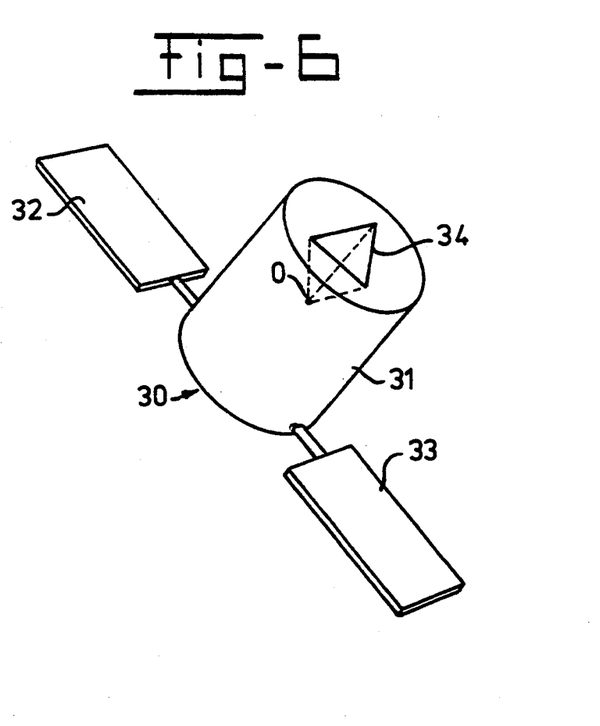
FIG. 6 illustrates an application of the inventive sensor configuration on a spacecraft.

Finally FIG. 6 illustrates an application of the inventive nine sensor configuration on a spacecraft. The spacecraft is as a whole indicated by reference number 30 and comprises a main body 31 and two solar cell panels 32 and 33. The actual shape of the spacecraft is, however, not important at all. On one face of the main body 31 a triangular configuration of nine accelerometers according to the invention herein, indicated as a whole by reference number 34, is installed. Preferably, the lay-out of the accelerometer configuration is such that the origin O of the orthogonal coordinate system for which the accelerometer configuration is laid out, coincides with the center of mass of the spacecraft 30.

Figure 7:
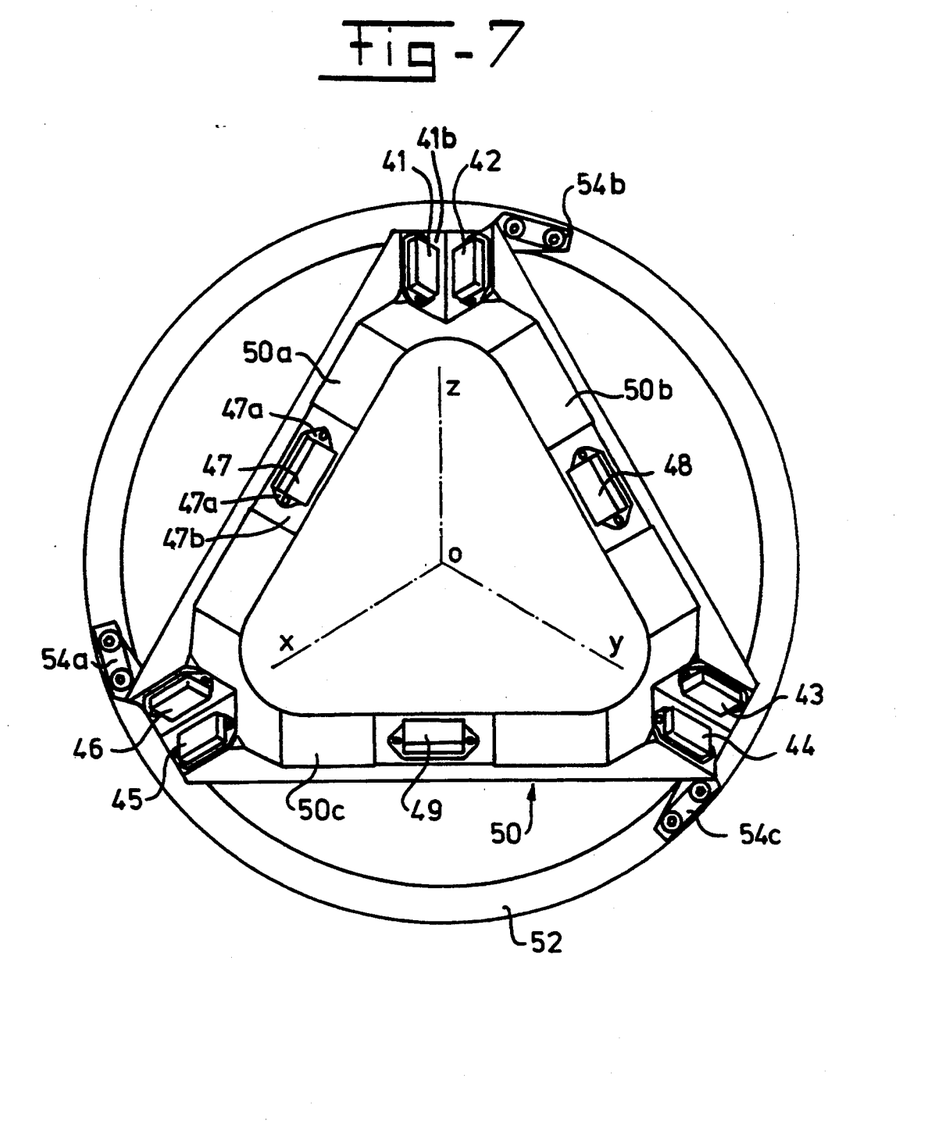
FIG. 7 illustrates a preferred embodiment of the assembly according to the invention.

An upper view on a preferred embodiment of the accelerometer assembly is shown in FIG. 7. The nine accelerometers are indicated by reference numbers 41 ... 49. The accelerometers as such are considered known to a person skilled in the art and need no further explanation. Suitable accelerometers are described in CSEM "Specifications of ASMAC 01-1g" and P. Roussel "Solid State Microaccelerometer Experiment"; accelerometers have a flat pad-like generally planar configuration and the axis of sensitivity extends approximately perpendicular to the plane of the pad, centrally thereof. Each accelerometer has the shape of a rectangular box with longitudinal extending mounting brackets, for example 47a at opposed ends by means of which brackets such as 47a the accelerometers are fastened to a triangular frame, 50. In the central space of the triangular frame the coordinate axes X, Y and Z of the imaginary orthogonal coordinate system as well as the origin O, thereof are indicated schematically.

The triangular frame 50 comprises three legs or beams identified separately in FIG. 7 by 50a, 50b and 50c. Each beam or leg has a number of seatings, for example 41b and 47b each intended to receive one of the accelerometers. Each seating such as 41b and 47b extends in a suitable direction such that after mounting the accelerometers the respective axis of sensitivity axis of each accelerometer is directed in the prescribed manner. More specifically the accelerometer 41 is mounted on seating 41b comprising a surface portion near one end of leg 50a which surface portion is oriented in relation to the imaginary orthogonal coordinate system such that the sensitive axis of accelerometer 41 is directed parallel to the Y-coordinate. The accelerometer 46 is mounted on a surface portion near the other end of leg 50a which surface portion is oriented in relation to the imaginary orthogonal coordinate system such that the sensitive axis of accelerometer 46 is directed parallel to the Y-coordinate. The accelerometer 47 is mounted on a seating 47b comprising a surface portion midway of leg 50a which surface portion is oriented in relation to the imaginary orthogonal coordinate system such that the sensitive axis of accelerometer 47 extends within the XZ-plane and through the origin O. It will be clear that the other accelerometers 42, 43, 44, 45, 48 and 49 are mounted on corresponding surfaces on the two other legs 50b and 50c such that their respective sensitive direction are oriented in the prescribed manner.

The triangular frame is in FIG. 7 connected to an adjusting ring 52 by means of three mounting brackets 54a, 54b and 54c, respectively attached to the triangular frame legs 50a, 50b and 50c. When the accelerometer arrangement is mounted onto the body, of which the motions have to be measured, for example a space craft as shown in the schematic view of FIG. 6, then first of all the adjustment ring 52 is fitted onto the body, so that the ring extends in the correct plane. Thereafter the triangular frame 50 is fixed to the adjustment ring 52 with the angular position of the frame 50 in relation to the ring 52 and more specifically in relation to the rigid body being adjusted in a suitable manner.

It will be clear that also in this embodiment the space in the central part of the triangular frame 50 can be used for housing the electronics circuitry and the processor, necessary to process the output signals from the accelerometers and to perform the necessary calculations to provide the desired angular and linear velocity output values.

We claim:

1. An assembly of accelerometers for use in a system for measuring the three dimension movements of a rigid body comprising nine linear accelerometers which are connected to said rigid body in a spacial configuration with reference to an imaginary orthogonal coordinate system whereby at a first position on the X-axis of the coordinate system displaced from the origin a first and second accelerometer are installed, the sensitive direction of the first accelerometer being parallel to the Y-axis of the coordinate system and the sensitive direction of the second accelerometer being parallel to the Z-axis of the coordinate system, at a second position on the Y-axis of the coordinate system displaced from the origin a third and fourth accelerometer are installed, the sensitive direction of the third accelerometer being parallel to the X-axis and the sensitive direction of the fourth accelerometer being parallel to the Z-axis, and at a third position on the Z-axis of the coordinate system displaced from the origin a fifth and sixth accelerometer are installed, the sensitive direction of the fifth accelerometer being parallel to the X-axis and the sensitive direction of the sixth accelerometer being parallel to the Y-axis, wherein a seventh accelerometer is installed at a fourth position midway on a line between the first and second positions, the sensitive axis of the seventh accelerometer coinciding with a line through said fourth position and the origin of the coordinate system, an eighth accelerometer is installed at a fifth position midway on a line between the second and third position, the sensitive axis of the eighth accelerometer coinciding with a line through said fifth position and the origin of the coordinate system and a ninth accelerometer is installed at a sixth position midway on a line between the third and first position, the sensitive axis of the ninth accelerometer coinciding with a line through said sixth position and the origin of the coordinate system.

2. An assembly of accelerometers according to claim 1, wherein the first, second and third positions are displaced equal distances from the origin.

3. An assembly of accelerometers according to claim 2 in combination with a supporting triangular frame having three sides meeting at three vertexes, wherein the nine accelerometers are installed on the triangular frame with two accelerometers at each of its vertexes and one accelerometer midway on each of its sides.

4. An assembly of accelerometers according to claim 1 in combination with a supporting triangular frame having three sides meeting at three vertexes, wherein the nine accelerometers are installed on the triangular frame with two accelerometers at each of its vertexes and one accelerometer midway on each of its sides.

5. An assembly of accelerometers according to claim 4, wherein the triangular frame consists of three elongated subassemblies the length of each subassembly corresponds to the length of a side of the frame, each subassembly comprising two accelerometers at an end and one accelerometer midway between both ends.

6. A system for measuring the three dimensional movements of a rigid body comprising an assembly of accelerometers according to claim 5 and electronic circuitry to amplify and shape the accelerometer signals to obtain signals which are suitable for transmission to a processor at least partially installed within the triangular frame.

7. A system for measuring the three dimensional movements of a rigid body comprising an assembly of accelerometers according to claim 4, and electronic circuitry to amplify and shape the accelerometer signals to obtain signals which are suitable for transmission to a processor at least partially installed within the triangular frame.

8. An assembly of accelerometers for determining rotational and translational movements of a rigid body in three dimensions with reference to an imaginary orthogonal coordinate system having an origin at a center of inertia of said rigid body, said assembly comprising:

a) multiple opposed X-axis accelerometers having directions of sensitivity lying in a mutual X-axis accelerometer plane and passing through an X-axis point displaced along said X-axis to be in a physically more accessible location than is said origin;

b) multiple opposed Y-axis accelerometers having directions of sensitivity lying in a mutual Y-axis accelerometer plane perpendicular to said X-axis accelerometer plane and passing through a Y-axis point displaced along said Y-axis to be in a physically more accessible location than is said origin;

c) multiple opposed Z-axis accelerometers having directions of sensitivity lying in a mutual Z-axis accelerometer plane perpendicular to said X-axis and Y-axis accelerometer planes and passing through a Z-axis point displaced along said Z-axis to be in a physically more accessible location than is said origin;

d) multiple origin-oriented accelerometers each having a direction of sensitivity passing through said origin;

wherein one of each direction of sensitivity of said origin-oriented accelerometers passes through an intermediate point between said X-axis point and said Y-axis point, between said Y-axis point and said Z-axis point and between said Z-axis point and said X-axis point.

9. An assembly of accelerometers according to claim 8, wherein said intermediate points are midway between the respective axis points.

10. An assembly of accelerometers according to claim 9 comprising a pair of X-axis accelerometers, a pair of Y-axis accelerometers and a pair of Z-axis accelerometer, in combination with a support frame, the accelerometers of each said pair being disposed on said support frame with their axes of sensitivity aligned to define said origin at a point externally of said frame and said origin-oriented accelerometers being mounted on said support frame between said pairs of accelerometers.

* * * * *

UNITED STATES PATENT AND TRADEMARK OFFICE
CERTIFICATE OF CORRECTION

PATENT NO. : 5,408,879

DATED : Apr. 25, 1995

INVENTOR(S) : Johannes P. B. Vreeburg, et al

It is certified that error appears in the above-identified patent and that said Letters Patent is hereby corrected as shown below:

On title page, item [73] should read as follows:
--Fokker Space & Systems B.V.--

Signed and Sealed this

Twenty-first Day of November, 1995

Attest:

BRUCE LEHMAN

*Attesting Officer*  *Commissioner of Patents and Trademarks*